Patented Dec. 5, 1939

2,181,882

UNITED STATES PATENT OFFICE 2,181,882

DESTRUCTION OF VERMIN ON SHELLFISH BEDS

Frank M. Flower, Oyster Bay, N. Y.

No Drawing. Application October 22, 1937,
Serial No. 170,349

6 Claims. (Cl. 43—124)

This invention relates to the destruction of vermin on shellfish beds, or submerged accumulations, and more especially involves a method for ridding oyster or clam farms of starfish, these pests being highly destructive and the cause of large economic loss, particularly in oyster cultivation.

The destruction wrought by starfish on oysters under cultivation is notorious, these vermin thriving and increasing at the expense of the oysters under growth, and traveling from one locality to another in their destructive work, resulting in an appalling reduction in crops. Various ways have been tried, without great success, for the elimination or reduction of loss caused by such vermin. The prevailing and best known method is perhaps the mechanical one of dragging over the bed so-called starfish mops, composed of tangled masses of strands or strings of cotton or the like, bunched as in a mop, and adapted to catch on to the starfish, some of which are thus picked up, hauled out and disposed of. But such system is highly uncertain and inefficient in results and slow and expensive in operation.

The object of the present invention in the art of cultivation of oysters or like shellfish, is to afford a means or method of treating a salt-water shellfish or oyster bed, or similar submerged accumulation of shellfish, for the substantial destruction of starfish or similar vermin infecting the same, without appreciable injury to the shellfish, and which is relatively thorough and efficient in practical use and inexpensive in operation.

For these purposes, the present invention consists in distributing lime upon the shellfish bed, or over the infested areas thereof, or accumulations thereof, in a manner to be received and rest or act, upon the bed or shellfish, and in quantities or strength sufficient to kill the vermin. Lime is an agent peculiarly adapted to the purposes hereof since it is not substantially injurious to the oysters or other shellfish, but on the contrary may even tend to the improvement thereof by whitening the shells and improving oyster growth and quality, being thus in contrast with other chemicals, as sulphate of copper, which are highly injurious to the shellfish and for that reason are not approved for this purpose, besides being unduly expensive and otherwise practically unavailable.

Referring more specifically to the method of the present invention the lime may be in the form either of unslaked lime or slaked or hydrated lime, and it may be applied in different physical forms, for example, in lumps or as granular or pulverized lime, or even in suspension in water or other liquid. Instead of ordinary commercial lime there may be employed ground mixtures or materials having lime as a component; understanding that the lime component is to be in sufficient proportion, strength and activity for effective destructive action upon the starfish, which requirement is not met by mere limestone in ground or other form which has not been calcined. In some cases lime which has been slaked is preferable because of its fine condition, spreading more thoroughly over larger areas by tide and current; but its activity does not persist for so long a period, and for certain cases unslaked lime is therefore preferred, sinking on the bed, burning the starfish and remaining active for several weeks or longer. Successive treatments may progressively practically eliminate the pest.

The treating agent so described may be applied or distributed to the bed in different ways. For example in dry or wet form it may be conducted by a conveyor or pipe substantially to the bottom and thereby distributed directly upon the bed. Preferably however the treating material is simply thrown or spread upon the surface of the water, being of sufficient specific gravity to sink rapidly into place upon the bed. The natural flow or currents of water act to carry the agent about and apply its effect thoroughly to all parts of the bed.

The distribution of the treating agent is preferably performed manually or otherwise from the deck of a boat or other vessel which may be caused to travel back and forth and so traverse or ply the area to be treated. Various kinds of known distributing apparatus may be employed. For example there may be a bin or barrel containing the material, with an outlet or door in its lower part and a feeding device for letting out the material in regulable quantities, as in dry granular or pulverized form. Or the material may be maintained on the vessel in a suitable container and played upon by a forcible jet of water causing it to be washed overboard and at the same time thus spread over the surface of the water at each side of the vessel.

The quantity of lime to be used may vary, a typical application of the method involving the depositing of from 1 to 3 barrels of lime per acre of bed. These quantities are not intended as limitations, since in some cases a fraction of a barrel per acre is found to give desirable results, while the maximum amount per acre need be without limit except in the matter of undue cost of material and expense of application if the quantity be excessive. The operation of destroying the vermin is believed to be a chemical action, the lime, or perhaps chlorine or other agents released by it, attacking the flesh of the starfish and gradually killing it; but there may be other destructive actions not necessary to enumerate or analyze, demonstrations establishing that the vermin are disposed of without impairment of the shellfish, and resulting in better and larger crops, as already stated. The basis of this invention is the discovery and application of the principle that the agent specified affords actually a selective action, leaving unharmed and even benefitted the shellfish under cultivation while destroying their enemies; and the agent also being practically adapted to the purpose in the sense that it is of such physical character as to be received and remain upon the submerged bottom for prolonged chemical action and results.

The same method and selective principle may be employed for accumulations of oysters when lifted or dredged, from the beds into tanks or enclosures, as on the deck of a vessel. In case these are vermin-infested they may be treated by lime applied to the submerged accumulation. This is useful in the transplanting or replanting of oysters, which may be thus treated in transit.

I claim:

1. In the art of cultivation of oysters or like shellfish the method of treating a shellfish bed for substantial destruction of starfish or like vermin infesting the bed without substantial injury to the shellfish under cultivation, said method consisting in methodically applying lime directly to the submerged bed by distributing it over the infested areas of the bed in a manner to be received or rest directly upon the bed and in sufficient quantities to kill or render harmless the vermin by the chemical action of the lime.

2. In the art of oyster cultivation the method of treating an oyster bed selectively for the substantial destruction of starfish infesting the bed and for the substantial improvement of the oysters under cultivation, said method consisting in applying lime directly to the submerged bed by distributing it over the infested areas of the bed in a manner to be received or rest directly upon the bed and in such ample proportions as to kill or render harmless the starfish by the chemical action of the lime and to benefit the oysters.

3. In the art of oyster cultivation the method of treating a submerged oyster bed selectively for the substantial destruction of starfish infesting the bed and for the substantial improvement of the oysters under cultivation, said method consisting in applying lime directly to the submerged bed by distributing it in solid form over the infested areas of the bed in a manner to be received and rest directly upon the bed and in such ample proportions and strength as to kill or render harmless the starfish by the chemical action of the lime while benefitting the oysters.

4. In the art of oyster cultivation the method of treating a submerged area of sea bottom occupied by both oysters and starfish for the substantial destruction of the starfish and for the substantial improvement of the oysters, said method consisting in applying and distributing lime directly upon the submerged area in such ample proportions as to kill or render harmless the starfish by the chemical action of the lime and to benefit the oysters.

5. In the art of cultivation of oysters or like shellfish the method of treating a submerged shellfish bed for substantial destruction of starfish or like vermin infesting the bed while leaving substantially unharmed the shellfish under cultivation, said method consisting in methodically applying lime directly to the submerged bed by distributing it over the infested areas of the bed from a vessel plying over the area of the bed and in a manner to sink and spread directly upon the bed and in sufficient quantities at least one barrel per acre of bed and of such active strength as to kill or render harmless the vermin by the chemical action of the lime.

6. In the art of cultiviation of oysters or like shellfish the method of treating a submerged accumulation of shellfish for substantial destruction of starfish or like vermin infesting the same without substantial injury to the shellfish under treatment, said method consisting in methodically applying lime directly to and distributing it over the infested accumulation in a manner to be received or rest directly upon the same and in sufficient quantities and strength to destroy or render harmless the vermin by the chemical action of the lime.

FRANK M. FLOWER.